Dec. 1, 1925.

M. B. SKINNER

BRANCH PIPE CONNECTION DEVICE

Filed March 2, 1923

1,563,406

Inventor:
Mortimer B. Skinner
By Luther Johns, Atty.

Patented Dec. 1, 1925.

1,563,406

UNITED STATES PATENT OFFICE.

MORTIMER B. SKINNER, OF WILMETTE, ILLINOIS.

BRANCH-PIPE CONNECTION DEVICE.

Application filed March 2, 1923. Serial No. 622,237.

*To all whom it may concern:*

Be it known that I, MORTIMER B. SKINNER, a citizen of the United States, residing at Wilmette, Cook County, Illinois, have invented certain new and useful Improvements in Branch-Pipe Connection Devices, of which the following is a specification.

The present improvements relate to that class of devices adapted to provide a connection between a laterally extending branch pipe and another pipe, for instance a water or gas main. Frequently the main is within the ground and the connection requires that a hole be dug to and around the main. Such connections are required to be made also at other difficultly accessible places.

The principal object of the present improvements is to provide a connection device of this class which is notably simple of construction, of few parts, one which is strong, durable and effective, and one which may be applied in a notably simple, easy and expeditious way in difficultly accessible places.

Figure 1:
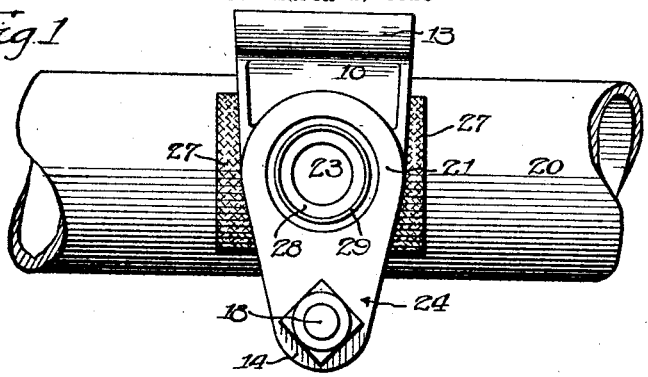
Figure 2:
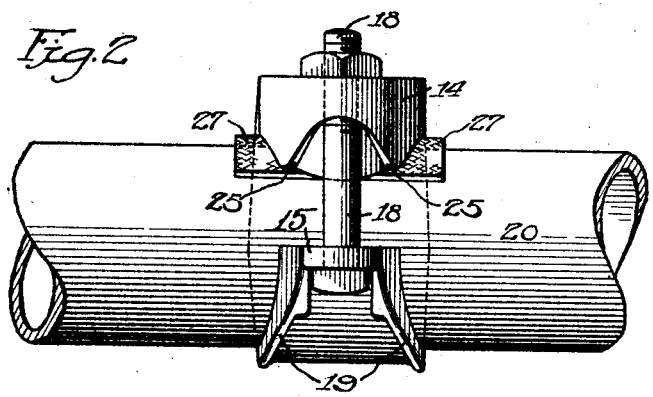
Figure 3:
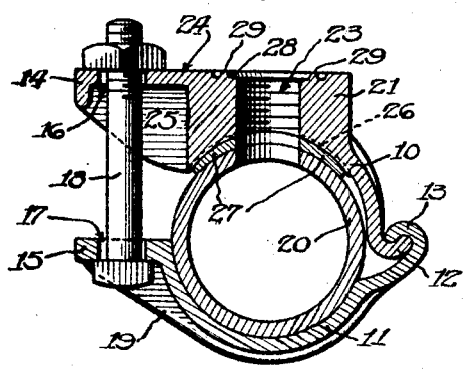
Figure 4:
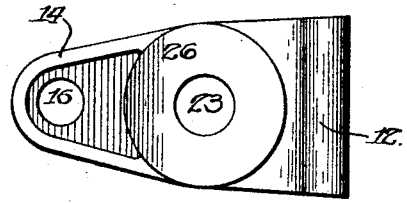

In the accompanying drawings, which form a part of this specification, Figure 1 is a top view of the device as applied to a pipe section; Fig. 2 is a side view thereof; Fig. 3 is a transverse medial section through the device and the clamped pipe; and Fig. 4 is a face view of the inner surfaces of one of the body members.

The device comprises two principal parts which may be described as the body member 10 and the body member 11. The member 10 has an integral rib-like connection member 12 extending longitudinally of the pipe, and this rib 12 is well encompassed by a trough-shaped connection member 13 integral with the body member 11, the connection at 12 and 13 being hinge-like, permitting the members to swing toward and away from each other, and the construction is such also that the rib or extension 12 may readily be inserted within the recess of the extension 13 and be readily removed therefrom.

At the side of the device opposite the interlocking connection at 12 and 13 are clamping means comprising an extension 14 integral with the body member 10 and an extension 15 integral with the member 11, the former being provided with a bolt opening 16 and the latter with a bolt opening 17 accommodating the bolt 18. From Fig. 2 it will be noted that the head of the bolt is in a pocket formed by strengthening flanges 19 and that these are adapted to hold the bolt against turning.

The body member 10 is provided with a materially thick portion 21 intermediate the extension 14 and the interlocking connection, and this thick part 21 is at a place where the body member overlies or encompasses the pipe or main as 20. The part 21 is provided with a hole 23, which is threaded to accommodate the threaded end of the branch pipe, and the hole 23 is so positioned that the branch pipe will be directed toward the main 20, the hole 23 being preferably on a line radial with respect to the circle defined by the main 20 at the device.

The nut-engaging surface 24 of the extension 14 is preferably on a level with what may be termed the top or outer surface of the relatively thick part 21, and this thick part is preferably substantially flat, the construction in this respect being such that a wrench may easily be applied to the nut for turning operations, a feature of much importance in view of the difficulty of wrench operations in the restricted areas often encountered where the work must be done. Webs 25 strengthen the extension 14.

From Figs. 3 and 4 it will be noted that a packing seat 26 is provided opposite the enlarged part 21, this seat being a slightly projecting or elevated part of the device on substantially cylindrical lines and being adapted to communicate clamping pressure upon a limited area immediately around the inner opening of the hole 23. The packing 27 may be of rubber compound or other composition, or a gasket of lead, according to particular requirements as is well understood in the art.

It will be noted that the hole 23 opens into a recess 28 at its outer end, and that an annular rib 29 is shown as extending outward from the recess 28. The recess is provided to afford a relatively high part adapted to protect the threads in the hole 23 against injury when the device is shipped and otherwise handled, and the rib 29 is provided as such an elevated protection substantially close to the hole in a form of device in which the hole 23 may be bored with a considerable larger diameter, say such as would cut away the rib 29, in which case the top surface of the enlargement 21 would be closely adjacent to the hole and afford the desired protection. The protection of the threads is important because these devices are installed in the field and away from tools suitable for straightening out a battered thread; and since the device is an iron casting, in my practice of malleable iron, the tendency of workmen is to handle them without particular care.

The device is ordinarily applied so as to make a branch connection by first positioning the two body members upon the pipe, the interlocking connection greatly facilitating this operation in a difficultly accessible place and permitting the two parts to be assembled and held easily until the bolt is applied. The packing such as 27 is either next inserted, or it may be placed upon the main as the first step. The bolt is then applied and the two body members are clamped tightly upon the main, which they encompass to a materially large extent as shown, the desired pressure being applied to make a strong and tight connection between the main and the device at and around the hole 23. A nipple may next be screwed into the hole 23, and a gate valve may then be threaded upon the nipple, the gate valve being of the kind having a plunger or valve stem which may be retracted so as to give a clear opening through the valve for boring operation. A boring device is then applied to the gate valve and a hole is bored first through the packing 27 and then on through the wall of the main 20. As soon as the hole is bored through the main the water, gas or other element flowing in the main issues through the valve, but as soon as the boring apparatus is taken away this flow is stopped by closing the valve.

The branch connection is thus made with the main, and thereafter it is only necessary to attach the rest of the branch pipe to the valve.

It will be noted that the interlocking connection at 12 and 13 is relatively long, a provision which insures that the clamping members shall be held firmly and strongly against tilting strains which might be brought to bear upon it, and, further, that a single bolt, which is on a crossline substantially midway between the ends of the connection, is adapted to hold the parts firmly in their desired position. The avoidance of the use of one or more bolts in a device of this kind is an important one, not only from the standpoint of cost, but importantly that of facilitating the assembling of the parts for use on the main.

I contemplate as being included in these improvements such modifications of and departures from what is specifically shown as are included in the appended claim.

I claim:

A branch-pipe connection device of the character described comprising a pair of complemental body members having an interlocking connection with each other at one side of the device adapted to provide for swinging movement of the members toward and away from each other, said members respectively being formed to encompass a pipe to a materially large extent and one thereof being materially thick where it normally overlies such pipe, the side portion of the device opposite said connection being provided with means for drawing the members toward each other, said means including two opposed extensions, one thereof being on each of said members, and a bolt associated with said extensions for drawing them toward each other, said materially thick portion having a hole therethrough adapted to accommodate a branch pipe directed toward a pipe normally held between said body members, the extension on one of said members having a nut-engaging surface substantially level with the outer surface of said materially thick part whereby the nut is free to be engaged by a wrench.

MORTIMER B. SKINNER.